Jan. 17, 1939.  E. VOLLENWEIDER  2,144,209
MOTION PICTURE PROJECTOR
Filed March 15, 1937  3 Sheets-Sheet 1

INVENTOR
Emil Vollenweider
BY
ATTORNEY

INVENTOR
Emil Vollenweider
BY
ATTORNEY

Jan. 17, 1939.   E. VOLLENWEIDER   2,144,209
MOTION PICTURE PROJECTOR
Filed March 15, 1937   3 Sheets-Sheet 3
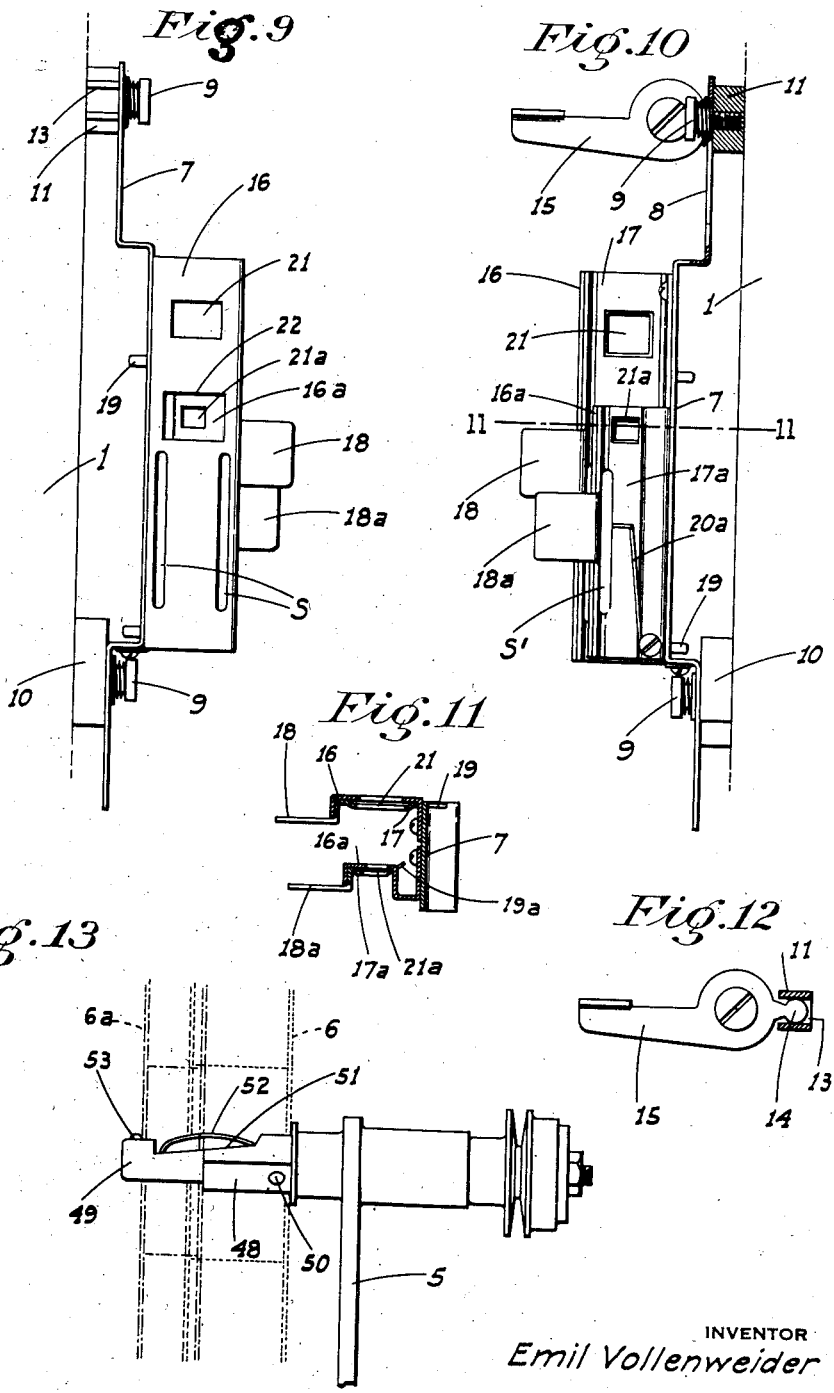
INVENTOR
Emil Vollenweider
BY
ATTORNEY Patented Jan. 17, 1939

2,144,209

UNITED STATES PATENT OFFICE 2,144,209

MOTION PICTURE PROJECTOR

Emil Vollenweider, Sacramento, Calif.

Application March 15, 1937, Serial No. 131,030

8 Claims. (Cl. 88—17)

This invention relates generally to a motion picture projector and, in particular, relates to a motion picture projector designed for double projection, the selective projection from either an 8 mm. or 16 mm. film. The present invention is an improvement over the projector shown in my United States Patent No. 1,981,255, issued November 20, 1934.

The principal object of the present invention is to provide a so-called "double projection" projector in which either 8 mm. or 16 mm. film may be used without the interchange of any parts as was necessary in my former projector, said object being accomplished by the use of improved feed spools, a film gate which compensates optically for the different size film and a shuttle mechanism which will drive either size film at the correct speed, all as hereinafter described.

Another object of my invention is to provide a motion picture projector of the type above indicated into which film of either size may be quickly threaded and with very little manipulation of the projector mechanism.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 9 is a rear elevation of the film gate.

Figure 10 is a front elevation of the film gate.

Figure 11 is a sectional plan of the film gate taken on line 11—11 of Fig. 10.

Figure 12 is a fragmentary view illustrating the framing control lever.

Figure 13 is an elevation of one reel supporting spindle illustrating in dotted lines the respective positions of a small reel (8 mm.) and a large reel (16 mm.) on the spindle.

Figure 1:
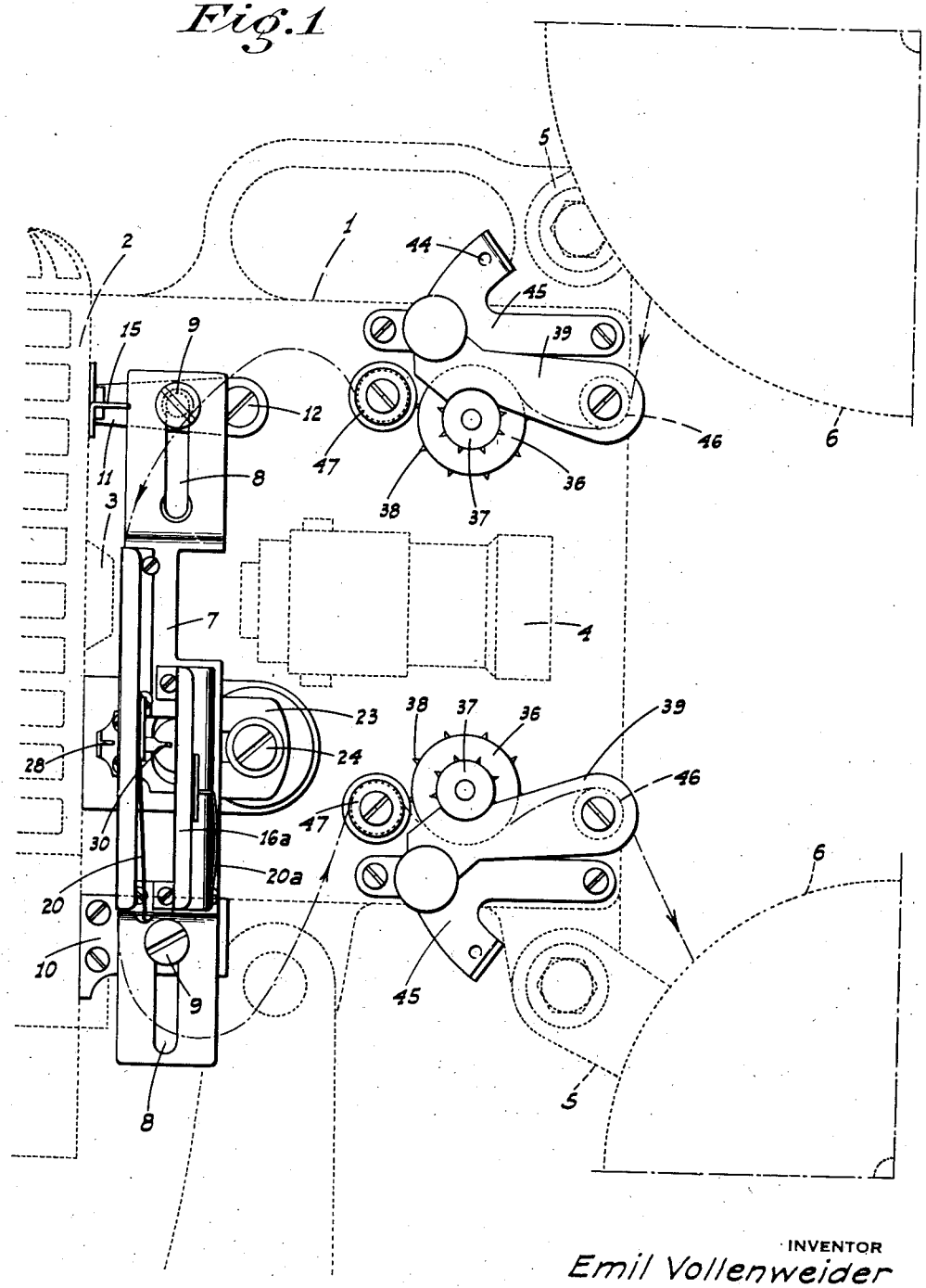
Figure 1 is a fragmentary side outline of the motion picture projector illustrating the mechanism employed to accomplish the above objects; a 16 mm. film being shown in place and in broken lines.
Figure 2:
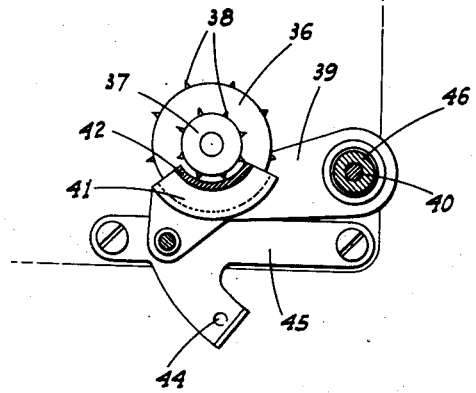
Figure 2 is a sectional elevation of the lower feed spool unit illustrating the film guard in place.
Figure 3:
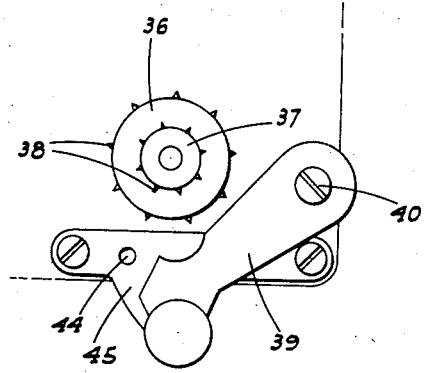
Figure 3 is an elevation of the lower feed spool unit illustrating the film guard in lowered or film threading position.
Figure 4:
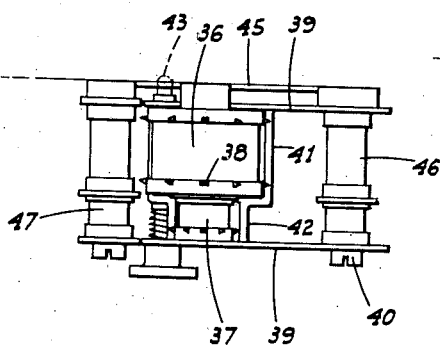
Figure 4 is a top plan view of the lower feed spool.
Figure 5:
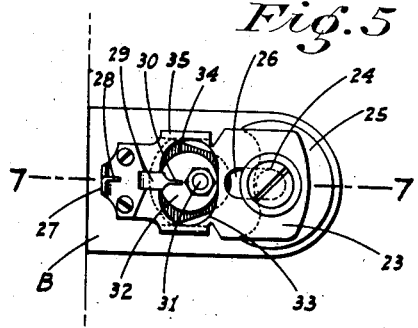
Figure 5 is a side elevation of the shuttle mechanism with the film claws in retracted position.
Figure 6:
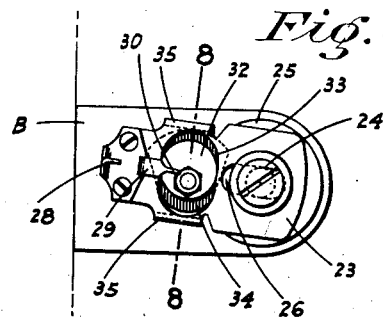
Figure 6 is a similar view but with the film claws raised but not materially advanced.
Figure 7:
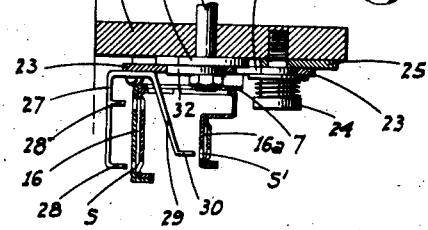
Figure 7 is a sectional plan view of the shuttle mechanism shown in connection with the film gate, and taken on line 7—7 of Fig. 5.
Figure 8:
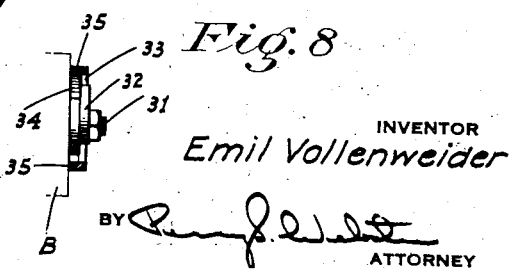
Figure 8 is a cross section on line 8—8 of Fig. 6.

Referring now more particularly to the characters of reference on the drawings, the projector, 10 other than the mechanism hereinafter specifically described and claimed, if of common construction and includes a body 1 which encloses the gear driven shafts for the feed spools and shuttle mechanism which are mounted on one side of said body. A ventilated casing 2 is mounted on the body 1 and projects laterally from said one side, the casing enclosing the source of light for the projector. A condenser lens 3 is mounted on the front of casing 2 and is disposed in axial alinement with a removable and adjustable projecting lens 4 mounted on the side of the body 1 some distance in front of casing 2. Arms 5 are mounted on and diverge forwardly from the body and at their outer ends support the spindles on which the supply and take-up film reels 6 are removably mounted. These reels are driven in the usual manner.

My improved film gate is mounted on and projects laterally from the side wall of the body and in front of the condenser lens 3. The gate mechanism comprises a vertical supporting plate 7 slotted lengthwise adjacent each end as at 8 and mounted for vertical sliding movement on spring tension bolts 9 which extend through the slots. The lower bolt 9 is threaded into a fixed bracket 10 while the upper bolt is threaded into a horizontal lever 11 intermediate the ends of the same. The lever 11 is pivoted at its forward end, as at 12, on the side of the body, the rear end of the lever being slotted, as at 13, to receive the oscillating head 14 of a finger lever 15 pivoted to the front of the casing 2 above lens 3. This finger lever effects slight vertical adjustment of plate 7 (for framing as will hereinafter appear) while slots 8 afford relatively great vertical adjustment of said plate.

A film gate 16, of 16 mm. width, is mounted vertically on the plate 7 and projects outwardly at right angles thereto, said gate including a removable presser plate 17 having a projecting finger piece 18. This presser plate is mounted in position by means of a tongue 19 which extends through an opening in the side of the gate opposite the finger piece 18, a spring 20 engaging the outer face of the presser plate and holding the same in place. Thus, the mounting for the presser plate is, in effect, a spring hinge but permits ready removal of the plate as is often necessary in order to clean the film gate. The film gate, including the attached pressure plate is, of course, formed with the usual picture framing opening 21 which, when said 16 mm. gate is in use, is alined between the condenser lens 3 and lens 4.

Another film gate 16—a of 8 mm. width and thus of smaller dimensions than the film gate 16, is mounted vertically on plate 7 parallel to gate 16 but spaced in front of said gate a predetermined distance as will hereinafter appear. This film gate 16—a, other than being of smaller size, is a duplicate of film gate 16 and includes a pressure plate 17—a, a finger piece 18—a, a tongue 19—a serving as a hinge for the presser plate, a spring 20—a to maintain the presser plate in position, and a picture framing opening 21—a. As the film gate 16—a is disposed ahead of film gate 16, the latter must be formed with an enlarged opening 22 in horizontal alinement with the picture framing opening 21—a for the reason hereinafter set forth.

When 16 mm. film is to be run in the projector, the plate 7 is disposed in lowered position, as shown clearly in Fig. 1. In such position, the picture framing opening 21 is substantially alined between lenses 3 and 4, the actual framing adjustment being accomplished by manipulation of lever 15 which raises or lowers plate 7 (and attached gate 16) the desired amount and independently of the position of plate 7 relative to bolts 9. If 8 mm. film is to be run, the plate 7 is raised until bolts 9 are disposed at the lower end of slots 8, the framing opening 21—a of film gate 16—a then being alined between lenses 3 and 4. As the gate 16 is provided with enlarged opening 22, light from lens 3 may be projected through framing opening 21—a without interference. Lever 15 also accomplishes the final framing adjustment when 8 mm. film is run.

Both film gates are positioned a predetermined distance from condenser lens 3 for the reason that the light is projected from said lens in a converging beam. Thus, film gate 16 with a larger framing opening must be closer to lens 3 while gate 16—a must be positioned at a point ahead of gate 16 and where the beam is more concentrated. Such positioning is essential to good reproduction and the correct optical position is determined by mathematical computation from the focal length of lens 3. By so positioning film gates 16 and 16—a, either 16 or 8 mm. film may be used selectively without interchange of the condenser lens.

The threading of the film through either gate is accomplished in the same manner. The finger piece is grasped and the presser plate swung open. The film is then slipped into place in the gate and the presser plate to return to a normal position under the influence of the spring.

The shuttle mechanism which intermittently moves the film through either one gate or the other without interchange or adjustment of parts such as cams (as was necessary in my former patent) comprises the following:

A shuttle arm 23 is pivoted on a spring tension bolt 24 threaded into a supporting block B on the side of body 1, a spacing washer 25 maintaining the arm free from the block for pivotal movement. The arm 23 is horizontally slotted, as at 26, in order that said arm may not only swing about the bolt as an axis but may also slide radially relative thereto. The arm extends rearwardly from bolt 24 alongside the film gates 16 and 16—a and is formed at its rear end with a laterally projecting finger 27 having spaced, forwardly extending film engaging claws 28. This finger 27 is disposed to the rear of gate 16 and the claws 28 extend through vertical slots S in the back of gate 16 whereby to engage in the openings in the 16 mm. film in said gate. Another finger 29 projects laterally from the shuttle arm 23 intermediate the two film gates, the finger being provided with a film engaging claw 30 which is aranged to engage the 8 mm. film in gate 16—a through vertical slot S'. Of course, plate 7 is also slotted to permit of unrestricted up and down motion of the finger 29. As the claw 30 is disposed closer to the pivotal axis of arm 23 than claws 28, claw 30 will move a lesser distance than claws 28. Thus, by proper spacing of the claws, the same shuttle unit may be used for both 16 mm. and 8 mm. film, the latter of course requiring less movement per frame.

A driven shaft 31, properly timed as is usual, extends through block B and a circular cam 32 is eccentrically mounted on the end thereof, said cam riding in a vertically disposed, oblong slot 33 cut in shuttle arm 23. Another eccentric cam 34, of substantially triangular configuration, is mounted on shaft 31 and engages with inturned flanges 35 on the upper and lower edges of the shuttle arm 23.

The cams 32 and 34 are so arranged that, with rotation of shaft 31, the shuttle arm will be so moved that the claws 28 and 30 will alternately travel in a true vertical plane and then in a true horizontal plane, the claws on the upward stroke being retracted and free of the film and advanced in a film engaging and moving position on the downward stroke. Such alternate rectilinear motion of the claws in both vertical and horizontal planes is accomplished only by an exacting balance between the cams, the circular cam functioning to compensate for the arcuate motion which would otherwise be imparted to the claws 28 and 30 as the triangular cam raises or lowers arm 23, while the triangular cam functions to compensate for the deflection from a horizontal plane which would otherwise occur as the circular cam advances or retracts the claws.

As the claws move with a rectilinear motion both vertically and horizontally, they move the film down through the gate without distortion or buckling which would wear the film, and they also retract from or advance to the film without binding as now occurs in some projectors where such movement is not accomplished.

By reason of the above described dual film gate and shuttle arrangement, either 16 mm. or 8 mm. film may be used in the projector without the interchange of any parts and the film may be easily threaded in either gate. Too, the particular shuttle structure affords an effective and silent means to impart intermittent movement to the film and without wear on the same.

The upper and lower feed spools which I employ are mounted on the side of body 1 in the usual position, and as they are duplicates, I will only describe the lower feed spool in detail. This feed spool is rotatably mounted on the side of the body and comprises axially alined, integral spool sections indicated at 36 and 37 respectively; the larger section 36 being of the correct diameter and width to engage and feed 16 mm. film while the other section 37 is smaller and arranged to engage and feed 8 mm. film. Both sections are formed with circumferentially spaced film engaging teeth 38. A spool guard is mounted adjacent the spool and comprises spaced arms 39 pivoted on a bolt 40 for swinging movement toward and away from the spool, and a head having segmental, arcuate portions 41 and 42 to maintain a film on either spool section, said faces being concentric with the axis of the spool when the guard is in operative position. A spring pressed detent 43 selectively engages sockets 44 in a back plate 45 whereby to maintain the guard in either operative or inoperative position. Free running rollers 46 and 47, the former being mounted between the pivoted ends of arms 39, guide the film F to the feed spool, said rollers being grooved to receive the respective film sizes.

As the above described projector may run either 16 mm. or 8 mm. film, it is necessary that the spindles for the feed and take-up reels be constructed to receive either a 16 mm. reel, indicated at 6, which sometimes have a square opening on one side and a small round opening on the other, or an 8 mm. reel, indicated at 6—a, having two small round openings. My improved spindle is shown in Fig. 13 and is constructed as follows:

Each spindle has a square portion 48 at its end nearest to the arm 5 over which the square opening in a 16 mm. reel may pass, the round opening on the other side of the reel engaging over a relatively small, projecting, round portion 49 and abutting against the outer end of portion 48. A ball detent 50 holds the 16 mm. reel in place. The spindle intermediate its ends is notched as at 51; a longitudinally depressible spring 52 being mounted therein. When a 16 mm. reel is in place this spring is depressed into the notch but when an 8 mm. reel is disposed on round portion 49, the spring serves to support one side of the reel while a ball detent 53 prevents escape of the reel from said portion of the spindle. The spring also engages in a notch (not shown) in the 8 mm. reel in order to maintain the reel and spindle in driving relation.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a motion picture projector for selective use with films of different width, said projector including a condenser lens of predetermined focal length, a film gate for film of one width, another film gate for film of a less width disposed ahead of said first named gate, each gate having a picture framing opening of proportionate size, means mounting the gates as a unit for selective movement into a substantial framing position, said gates each being disposed a predetermined distance in front of the condenser lens.

2. In a motion picture projector arranged for selective use with films of different widths, a film gate unit including a gate for film of one width and a gate for film of another width, each gate having a picture framing opening, said openings being disposed in different planes, means mounting the gate unit on the projector for selective movement to place either opening in substantial framing position, and other means including said first named means in part arranged to effect an additional and relatively sensitive framing adjustment of the openings; said last named means being operative whether one gate or the other is positioned with the opening therein in substantial framing position.

3. A device as in claim 2 in which said first named means comprises a supporting plate, said plate being slotted longitudinally adjacent one end, a bolt extending through said slot, and a compression spring surrounding the bolt between the head thereof and one side of the plate; and in which said last named means includes a lever pivoted at one end on the body of the projector and extending across the other side of the plate, said bolt being secured on the lever intermediate its ends.

4. A device as in claim 2 in which said first named means comprises a supporting plate, said plate being slotted longitudinally adjacent one end, a bolt extending through said slot, and a compression spring surrounding the bolt between the head thereof and one side of the plate; and in which said last named means includes a lever pivoted at one end on the body of the projector and extending across the other side of the plate, said bolt being secured on the lever intermediate its ends, there being an actuating lever operatively connected at one end with the free end of said first named lever and pivoted adjacent said one end for swinging movement.

5. In a motion picture projector for selective use with films of different widths, said projector including a condenser lens of predetermined focal length, and a separate film gate for each width film which the projector is adapted to project, each gate having a framing opening of a proportionate size; the gates each being positioned ahead of the condenser lens a distance predetermined from the focal length of said lens and the gate having the smallest frame opening being disposed most remote from the condensing lens, each gate being positioned so that its framing opening is of less extent than the cross-sectional extent of the converging condenser lens at the plane of intersection thereof by such gate.

6. In a motion picture projector for selective use with films of different widths, a condenser lens, a vertical supporting plate disposed to one side of the path of the beam from said lens, means mounting said plate for vertical movement, a film gate for film of one width, a separate film gate for film of another width, each gate including a separate presser plate arranged to maintain the film in the corresponding gate, there being a picture framing opening through each gate and cooperating presser plate, said gates being mounted on the supporting plate in spaced relation lengthwise of the lens beam and with said openings disposed in different horizontal planes whereby with vertical movement of the supporting plate either gate may be disposed with its opening in framing position; the framing opening of the one gate nearest the lens being disposed above the upper end of the other gate and the framing opening of said other gate being disposed in front of a portion of said one gate, there being an opening in said one gate embracing said portion and of materially greater size than the framing opening in the other gate.

7. In a motion picture projector for selective use with films of different widths, a condenser lens, a vertical supporting plate disposed to one side of the path of the beam from said lens, means mounting said plate for vertical movement, a film gate for film of one width, a separate film gate for film of another width, each gate including a separate presser plate arranged to maintain the film in the corresponding gate, there being a picture framing opening through each gate and cooperating presser plate, said gates being mounted on the supporting plate in spaced relation lengthwise of the lens beam and with said openings disposed in different horizontal planes whereby with vertical movement of the supporting plate either gate may be disposed with its opening in framing position, and springs arranged with the gates to form hinges for the plates and acting to maintain said plates in a film engaging position.

8. In a motion picture projector for selective use with films of different widths, a condenser lens, a vertical supporting plate disposed to one side of the path of the beam from said lens, means mounting said plate for vertical movement, a film gate for film of one width, a separate film gate for film of another width, each gate including a separate presser plate arranged to maintain the film in the corresponding gate, there being a picture framing opening through each gate and cooperating presser plate, said gates being mounted on the supporting plate in spaced relation lengthwise of the lens beam and with said openings disposed in different horizontal planes whereby with vertical movement of the supporting plate either gate may be disposed with its opening in framing position, and means to detachably connect the pressure plates with the gates.

EMIL VOLLENWEIDER.